United States Patent [19]

Kamijo et al.

[11] 4,438,969

[45] Mar. 27, 1984

[54] COLLISION RESISTANT CONSTRUCTION FOR A DOOR OF A VEHICLE

[75] Inventors: Ken Kamijo, Zushi; Kouzo Maeda, Yokohama, both of Japan

[73] Assignee: Nissan Motor Co., Ltd., Kanagawa, Japan

[21] Appl. No.: 319,102

[22] Filed: Nov. 6, 1981

[30] Foreign Application Priority Data

Nov. 7, 1980 [JP] Japan .......................... 55-160193[U]

[51] Int. Cl.³ .............................................. B60J 5/04
[52] U.S. Cl. ................................. 296/146; 296/65 R
[58] Field of Search ...................... 296/146, 65 R, 202

[56] References Cited

U.S. PATENT DOCUMENTS 3,788,686  1/1974  Rossie et al. ...................... 296/146
3,819,228  6/1974  Cornacchia ........................ 296/146

FOREIGN PATENT DOCUMENTS 1583852  4/1978  United Kingdom .

Primary Examiner—Robert R. Song
Attorney, Agent, or Firm—Lowe, King, Price & Becker

[57] ABSTRACT

An first device is securely connected to at least one of a sliding mechanism of a seat assembly and a seat proper frame and has a rigidly constructed extreme end portion which extends outwardly toward the door opening in the vicinity of the side sill. A second device is provided on a hinged side door and positioned at a portion of the door which faces the extreme end portion upon normal closing of the side door. When the side door tends to be driven into the vehicle cabin by a violent external force applied thereto, the second device is brought into secure engagement with the extreme end portion of the first device thereby preventing the door from continuing the driving-in motion.

12 Claims, 7 Drawing Figures

COLLISION RESISTANT CONSTRUCTION FOR A DOOR OF A VEHICLE

BACKGROUND OF THE INVENTION

1. Field of the Invention

The present invention relates in general to a vehicle body construction having a safety means for protecting passengers from injuries in vehicle collisions, and more particularly to a collision resistant construction for a door of a vehicle, which prevents a hinged side door from driving into the vehicle cabin upon a side vehicle collision.

2. Description of the Prior Art

When a motor vehicle is subjected to a side vehicle collision causing deformation of a side door thereof, the door thus deformed tends to be driven into the vehicle cabin, so that it sometimes happens that a passenger in the cabin is sandwiched between the driven door and any projection, such as a console box, mounted in the vehicle cabin, thus critically endangering the passenger's life. Hitherto, various solutions have been proposed for eliminating such problem. However, some of them lack functional reliability and are uneconomic.

SUMMARY OF THE INVENTION

It is therefore an object of the present invention to provide a functionally reliable and economical collision resistant construction for a door which is capable of preventing the bumped side door from driving into the vehicle cabin during a side vehicle collision.

According to the present invention, there is provided a collision resistant construction for a door of a vehicle having a door opening, a hinged side door operable to close and open said door opening, and a seat assembly located in the vehicle cabin beside the door opening. The collision resistant construction comprises a sliding mechanism securely mounted on a floor of the vehicle, the sliding mechanism having mounted thereon a frame for a seat proper, the sliding mechanism for permitting sliding movement of the seat assembly in a fore-and-aft direction relative to the floor; first means securely connected to at least the sliding mechanism and the seat, the first means having a rigidly constructed extreme end portion which extends outwardly toward the door opening in the vicinity of the side sill; and second means provided on the hinged side door to be movable therewith, the second means being positioned at a portion of the door which faces the extreme end portion upon closing of the side door, whereby when the side door tends to be driven into the vehicle cabin by an external force applied thereto, the second means is brought into tight engagement with the extreme end portion of the first means thereby preventing the door from continuing the driving-in motion.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
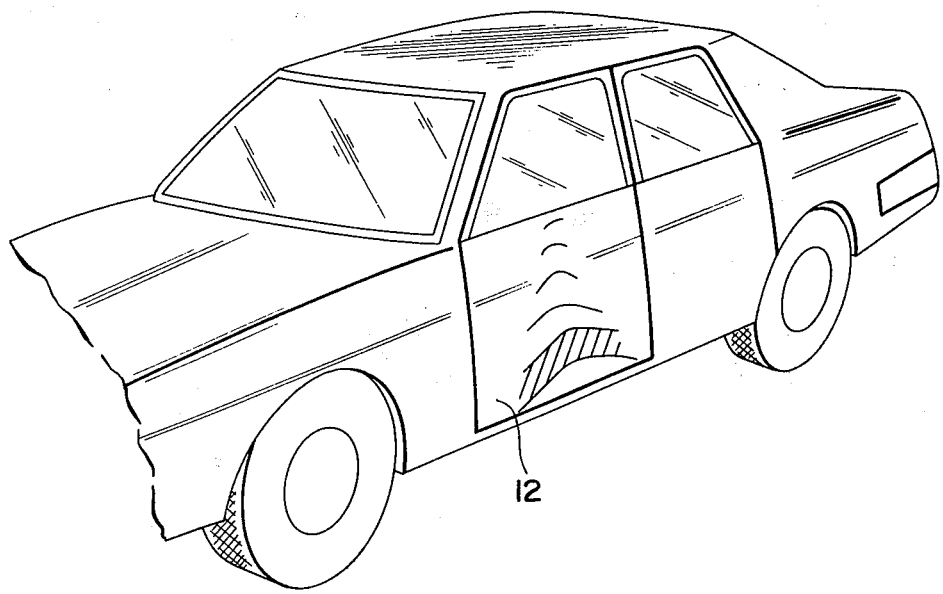
FIG. 1 is a perspective view of a conventional passenger motor vehicle having a side door which is deformed by a side vehicle collision.

Referring to FIG. 1, there is shown a passenger motor vehicle which has just encountered a side vehicle collision, leaving a considerable deformation of a side door 12 because of lack of a suitable collision resistant construction.

Figure 2:
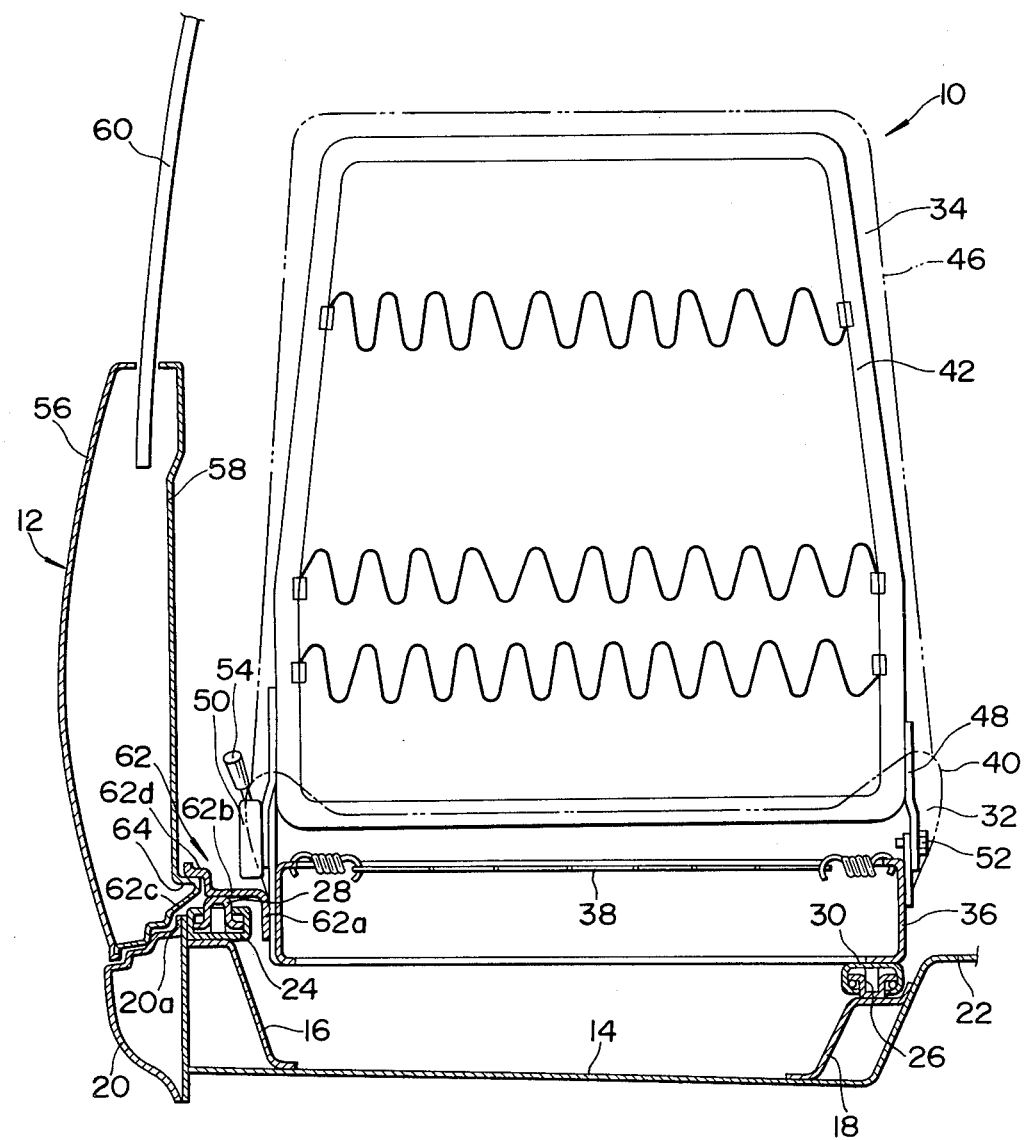
FIG. 2 is a vertically sectional view of a collision resistant construction of a first embodiment according to the present invention.

Turning now to FIG. 2, there is shown a collision resistant construction of a first embodiment according to the present invention. As will become clear as the description proceeds, the collision resistant construction of the present invention cooperates with both a seat assembly 10 and a side door 12. Thus, the outlined construction of the seat assembly 10 and that of the side door 12 will be described prior to describing the esssential parts and construction of the collision resistant construction.

The seat assembly 10 is mounted on a floor panel 14 through a sliding mechanism which permits sliding movement of the seat assembly 10 in fore-and-aft direction relative to the floor panel 14. Two spaced elongate brackets 16 and 18, for mounting the sliding mechanism thereon, are securely mounted on the floor panel 14 to extend in a direction parallel with the longitudinal axis of the vehicle. The bracket 16 is located adjacent a side sill 20 and the other bracket 18 is located adjacent a transmission tunnel 22 as shown. The sliding mechanism shown comprises a pair of lower rails 24 and 26 securely mounted on the elongate brackets 16 and 18 respectively, and a pair of upper rails 28 and 30 longitudinally slidably engaged with the lower rails 24 and 26 respectively. Although not shown in the drawing, a known locking device is arranged in the sliding mechanism to lock the upper rails 28 and 30 at a desired position relative to the lower rails 24 and 26.

The seat assembly 10 comprises generally a seat proper 32 and a seatback 34 which is tiltable relative to the seat proper 32. The seat proper 32 comprises a rectangular frame 36 which is securely mounted on the upper rails 28 and 30 of the sliding mechanism to be movable therewith. A plurality of wire springs 38 extend between spaced sections of the frame 36, and a cushion member 40 is mounted on the wire springs 38, covering the frame 36. The seatback 34 comprises a generally rectangular frame 42, a plurality of wire springs 44 extending parallel between spaced sections of the frame 42, and a cushion member 46 mounted on the springs 44 to cover the frame 42. For achieving the pivotal movement of the seatback 34 relative to the seat proper 32, a hinge device 48 of known construction and a tilting device 50 of known construction are arranged between them. The hinge device 48 comprises a stationary arm secured to the frame 36 of the seat proper 32, a movable arm secured to the frame 42 of the seatback 34, and a bolt 52 pivotally connecting these arms. The tilting device 50 comprises a stationary arm secured to the seat proper frame 36, a movable arm secured to the seatback frame 42, and a locking mechanism incorporating with these arms to lock the seatback 34 at a selected angular position relative to the seat proper 32. Designated by numeral 54 is an operating lever of the tilting device 50.

The side door 12 which is of a swing type is shown as comprising an outer panel 56, an inner panel 58 and a window glass 60. The door 12 is hinged to the vehicle body to open and close a door opening (no numeral) defined above the side sill 20 beside the seat assembly 10.

In the following, the essential parts and construction of the collision resistant construction of the first embodiment will be described in detail.

A rigid elongate member 62 constructed of a strong metal, such as a steel, is employed through which the seat proper frame 36 is mounted to the upper rail 28 of the sliding mechanism. Although not well shown, the member 62 extends along the longitudinal axis of the vehicle. The member 62 has a stepped cross section and comprises, as is seen from the drawing, a first vertical wall section 62a welded to the outside section of the seat proper frame 36, a first horizontal wall section 62b extending horizontally and outwardly from the top of the first vertical wall section 62a and welded to the upper rail 28, a second vertical wall section 62c extending upwardly from the outside end of the first horizontal wall section 62b, and a second horizontal wall section 62d extending horizontally and outwardly from the top of the second vertical wall section 62c. The leading end of the second horizontal wall section 62d is bent upwardly, as shown. It is to be noted that the first horizontal wall section 62b has a width sufficient for providing an adequate distance or space between the first vertical wall section 62a and the second vertical wall section 62c.

A laterally extending elongate projection 64 is formed on the inner panel 58 of the door 12 at a lower portion thereof, that is, a portion which is engageable with the above-mentioned rigid elongate member 62 when closing the door 12. The elongate projection 64, which may be press-formed, extends horizontally from the front end of the door 12 to the rear end of the same. The elongate projection 64 is located and sized so that when the door 12 is normally closed, the projection 64 is smoothly received in an elongate recess (no numeral) defined between the second vertical wall section 62c and the second horizontal wall section 62d in a manner as shown by the drawing. That is, under normal closed position of the door 12, only the upper surface of the elongate projection 64 engages slidably with the second horizontal wall section 62d, having the top of the projection 64 spaced from the second vertical wall section 62c.

When the vehicle is subjected to a side vehicle collision, that is, when another vehicle collides against the door 12 causing deformation of the same, the deformed door tends to be driven into the vehicle cabin. However, the door driving-in motion is blocked safely by the rigid elongate member 62 which is rigidly connected to the floor panel 14 through the sliding mechanism. In fact, upon collision, the top of the elongate projection 64 of the door inner panel 58 is brought into engagement with the second vertical wall section 62c of the rigid elongate member 62, thereby transmitting the impact force applied to the door 12 to the floor panel 14 through the rigidly constructed sliding mechanism and the seat proper frame 36. Further, if the vehicle collision is so violent as to break the connection between the seat proper frame 36 and the floor panel 14, the inward dislocation of the seat assembly 10 thus induced by the deformed door 12, is carried, keeping a safe distance between the door 12 and the seat assembly 10 by the function of the rigid elongate member 62 moved with the seat assembly 10. Thus, the occupant on the seat assembly 10 is protected from injury. Although, upon the vehicle collision, the door 12 is deformed having the lower portion thereof raised in a manner as is shown by FIG. 1, the degree of the deformation of the door lower portion is small because of engagement between the elongate projection 64 and the second horizontal wall section 62d of the rigid elongate member 62.

Figure 3:
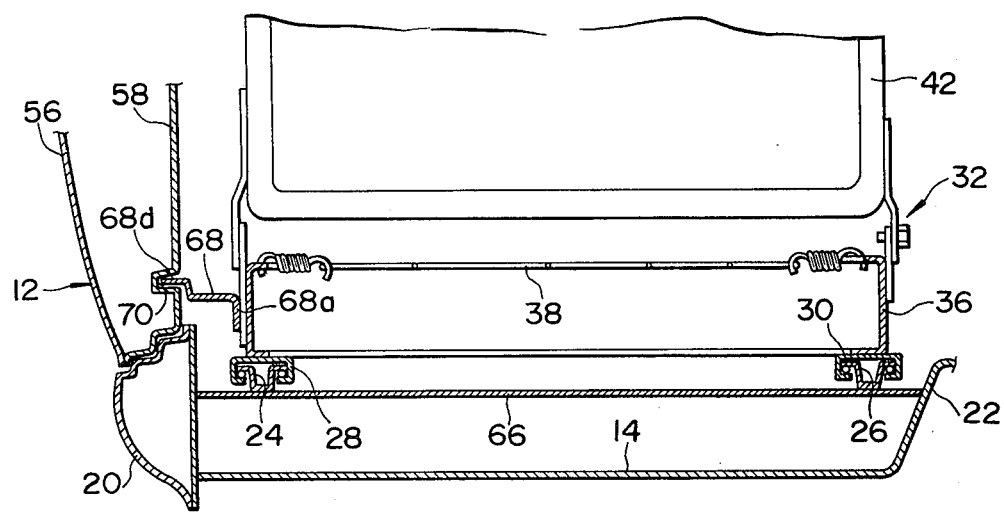
FIG. 3 is a view similar to FIG. 2, but showing a second embodiment of the present invention.

Referring to FIG. 3, there is shown a second embodiment of the present invention. Similar parts to those of the first embodiment (FIG. 2) are designated by the same numerals. The seat proper frame 36 of the seat assembly hereinshown is mounted through the sliding mechanism (24,28,26,30) on transverse beams 66 which are spanned between the side sill 20 and the transmission tunnel 22.

A rigid elongate member 68 having substantially the same configuration as the rigid elongate member 62 of the first embodiment is employed. The member 68 is welded at the first vertical wall section 68a to the outside section of the seat proper frame 36. Unlike the first embodiment, the leading end of the second horizontal wall section 68 is not bent.

A laterally extending groove 70 is formed on the door inner panel 58 at a lower portion thereof, that is, a portion which faces to face with the leading end of the second horizontal wall section 68 of the rigid elongate member 68 when closing the door 12. As is seen from the drawing, the elongate groove 70 is sized so that when the door 12 is in its closed position, the second horizontal wall section 68d is spacedly received in the elongate groove 70.

Since the function of the door stopping arrangement of this second embodiment is substantially the same as that of the first embodiment as will be easily known to those skilled in the art, the description of it will be omitted.

Figure 4:
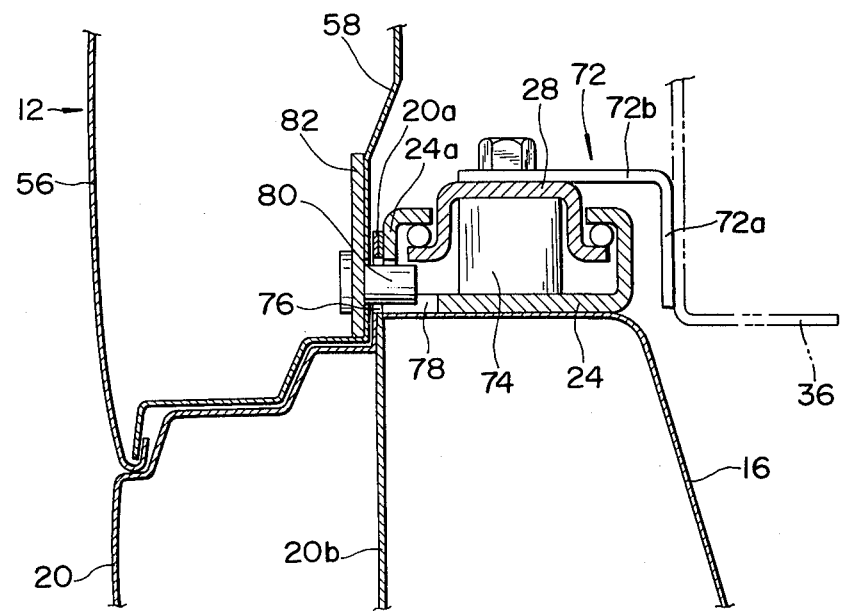
FIG. 4 is an enlarged sectional view showing the essential portion of a third embodiment.
Figure 5:
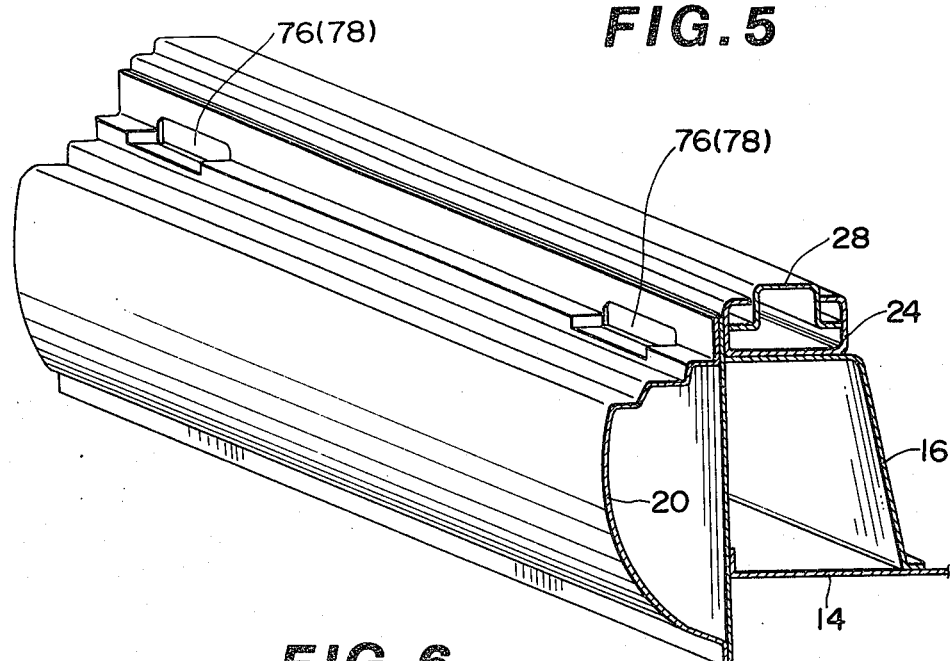
FIG. 5 is a fragmentary perspective view of the essential portion of the third embodiment.

Referring to FIGS. 4 and 5, there is shown a third embodiment of the present invention. The door stopping arrangement of this third embodiment comprises a rigid elongate member 72 which is welded at its vertical wall section 72a to the outside section of the seat proper frame 36 and bolted at its horizontal wall section 72b to the upper rail 28 of the outside-positioned sliding mechanism. As will be understood from the drawings (FIGS. 4 and 5), the lower rail 24 of the sliding mechanism is securely mounted on the flat top of the bracket 26 with its outside-positioned wall section 24a extending along a flange 20a of the side sill 20, the flange 20a being arranged to be flush with an inner panel 20b of the side sill 20, as shown. Designated by numeral 74 are rollers which are arranged between the lower and upper rails 24 and 28. As is well seen from the drawings, the flange 20a of the side sill 20 is formed with a plurality of spaced rectangular openings 76 which are merged with corresponding openings 78 formed in the outside-positioned wall 24a of the upper rail 24.

A plurality of rectangular projections 80 are connected through a retaining plate 82 to the lower section of the door inner panel 58 to extend outward of the door 12, that is, toward the vehicle cabin. The projections 80 are arranged and sized to be deeply received in the corresponding rectangular openings 76 and 78 of the flange 20a and the lower rail 24 when the door 12 takes its close position in a manner as shown by FIG. 4.

Similar to the first embodiment, the impact force applied, upon a side vehicle collision, to the side door 12 is transmitted to the floor panel 14 through the rigidly constructed sliding mechanism and the seat proper frame 36.

In addition to the above, according to the third embodiment, the critical lower section raising of the door 12 at the collision is suppressed because of the latching engagement between the projections 80 of the door 12 and the openings 76 and 78 of the flange 20a and the lower rail 24. Thus, the door driving-in motion is inhibited much more effectively.

Figure 6:
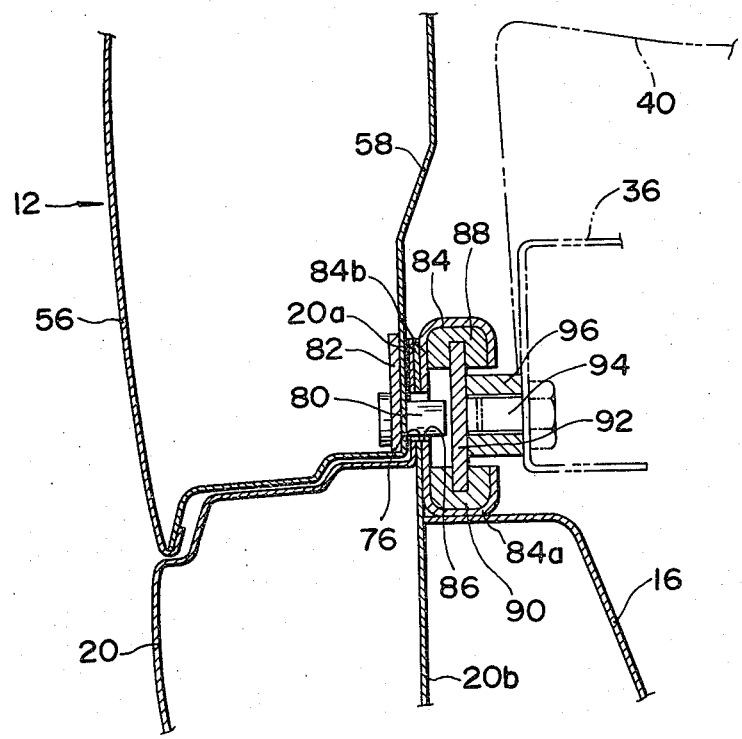
FIG. 6 is a view similar to FIG. 4, but showing a fourth embodiment of the present invention.
Figure 7:
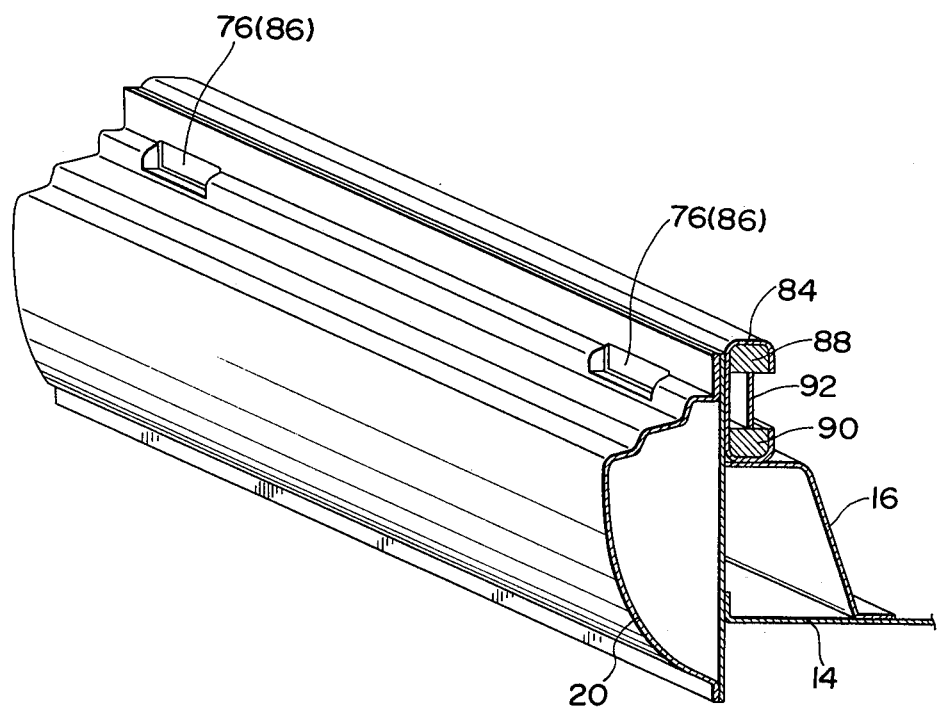
FIG. 7 is a fragmentary perspective view of the essential portion of the fourth embodiment.

Referring to FIGS. 6 and 7, there is shown a fourth embodiment of the present invention. The door stopping arrangement of this embodiment is generally the same as that of the third embodiment except for the construction of the sliding mechanism. The sliding mechanism comprises an elongate guide rail 84 having a generally C-shaped cross section. The guide rail 84 is welded at its one shorter wall section 84a to the flat top of the bracket 16 with its major bottom section 84b extending along the flange 20a of the side sill 20. The bottom section 84b is formed with a plurality of rectangular openings 86 which are merged with the corresponding rectangular openings 76 formed in the flange 20a. Longitudinally slidably received in the guide rail 84 is a guided member. The guided member comprises a pair of elongate sliders 88 and 90 slidably contacting with the upper inner and lower inner surfaces of the guide rail 84 and an elongate support 92 by which the sliders 88 and 90 are supported. The support 92 is connected to the seat proper frame 36 by means of a plurality of bolts 94. Designated by numeral 96 are spacers which are secured to the support 92.

The function of the door stopping arrangement of the fourth embodiment is substantially the same as that of the third embodiment of FIGS. 4 and 5, as will be easily understood.

What is claimed is:

1. A collision resistant construction for a door of a vehicle having a door opening defined above a side sill, a hinged side door operable to open and close said door opening and a seat assembly located in the vehicle cabin beside said door opening, comprising:

a sliding mechanism securely mounted on a floor of said vehicle, said sliding mechanism having mounted thereon a seat proper frame of said seat assembly for permitting a sliding movement of said seat assembly in a fore-and-aft direction relative to said floor;

first means securely connected to said sliding mechanism and said seat proper frame, said first means having a rigidly constructed extreme end portion which extends outwardly toward said door opening in the vicinity of said side sill; and second means provided on said hinged side door to be movable therewith, said second means being positioned at a portion of the door which faces said extreme end portion upon normal closing of said side door, whereby, when said side door tends to be driven into the vehicle cabin by an external force applied thereto, said second means is brought into secure engagement with said extreme end portion of said first means thereby preventing said door from continuing the driving-in motion.

2. A collision resistant construction as claimed in claim 1, in which said first means comprises a rigid elongate member which is secured at its one end to the outside section of said seat proper frame and at its middle section to an upper rail of said sliding mechanism, said rigid elongate member having an extreme end extending outwardly toward said door opening in the vicinity of said side sill, and in which said second means comprises an elongate projection which is formed on an inner panel of said door, said elongate projection being located and sized so that when said door is in its normal closed position, said extreme end of said elongate member rides on said elongate projection.

3. A collision resistant construction as claimed in claim 2, in which said rigid elongate member extends along the longitudinal axis of the vehicle and comprises a first vertical wall section welded to the outside section of the seat proper frame, a first horizontal wall section extending horizontally and outwardly from the top of said first vertical wall section and welded to the upper rail, a second vertical wall section extending upwardly from the outside end of said first horizontal wall section, and a second horizontal wall section extending horizontally and outwardly from the top of the second vertical wall section, said second horizontal wall section being engageable with said elongate projection on said door under normal closing of said door.

4. A collision resistant construction as claimed in claim 3, in which the leading end of said second horizontal wall section is bent upwardly.

5. In a vehicle having a door opening defined above a side sill, a side door hinged to the body of the vehicle to open and close said door opening, a seat assembly located in the vehicle cabin beside said door opening, and a seat sliding mechanism mounted on the floor of the vehicle cabin for permitting the seat assembly to move in fore-and-aft directions, the improved side collision resistant structure comprising:

first means comprising an elongate rigid member which extends along the longitudinal axis of the vehicle, said rigid member being securely connected at one entire lateral side portion to said seat sliding mechanism and a frame of the seat cushion portion of the seat assembly, and having the other lateral entire side portion projected outwardly toward said door opening in the vicinity of said side sill;

second means forming on the inboard side of said side door a reinforced structure, and reinforced structure being positioned at a portion of the door which faces the other lateral entire side portion of said elongate rigid member when said door assumes its normal closed position, whereby, when said side door tends to be driven into the vehicle cabin by an external abnormal force applied thereto, said second means is brought into engagement with the other lateral entire side portion of said elongate rigid member thereby preventing the side door from continuing the driving-in motion.

6. A collision resistant construction as claimed in claim 5, in which said first means comprises a rigid elongate member which is secured at its one end to the outside section of the seat proper frame, said elongate member having an extreme end extending outwardly toward said door opening in the vicinity of said side sill, and in which said second means comprises an elongate groove formed on the inner panel of said door, said elongate groove being located and sized so that when said door is in its normal close position, the extreme end of said rigid elongate member is spacedly received in said elongate groove.

7. A collision resistant construction as claimed in claim 6, in which said rigid elongate member extends along the longitudinal axis of said vehicle and has a stepped cross section.

8. A collision resistant construction as claimed in claim 7, in which said sliding mechanism comprises two spaced lower rails mounted on cross beams spanned between said side sill and a transmission tunnel of the vehicle body, and two spaced upper rails which slide on said lower rails respectively, said upper rails mounting thereon said seat proper frame.

9. A collision resistant construction as claimed in claim 5, in which said first means comprises the sliding mechanism which includes a lower rail stationarily connected to the vehicle floor, and an upper rail which slides on said lower rail and mounts thereon said seat proper frame through a bracket, said lower rail being formed with a plurality of openings at its outside wall section, and in which said second means comprises a plurality of projections which are secured to an inner panel of said door, said projections being located and sized so that when said door is in its normal closed position, the leading ends of said projections are deeply received in the openings of said lower rail.

10. A collision resistant construction as claimed in claim 9, in which said projections are secured to said door inner panel through a retaining plate.

11. A collision resistant construction as claimed in claim 10, in which said side sill has a flange extending along said lower rail, said flange having a plurality of openings which are merged with the openings of said lower rail.

12. A collision resistant construction as claimed in claim 5, in which said first means comprises the sliding mechanism which includes a guide rail of generally C-shaped cross section stationarily connected to the vehicle floor, said guide rail being secured at its one shorter wall section to the floor with its major bottom section standing normal to the floor, and a guided member slidably received in said guide rail and connected to said seat proper frame through connecting means, said guide rail being formed with a plurality of openings at the major bottom section, and in which said second means comprises a plurality of projections which are secured to an inner panel of said door, said projections being located and sized so that when said door is in its normal closed position, the leading ends of said projections are deeply received in said openings of said guide rail.

* * * * *